United States Patent
Bohlender et al.

(10) Patent No.: US 11,035,589 B2
(45) Date of Patent: Jun. 15, 2021

(54) ELECTRIC HEATING DEVICE

(71) Applicant: Eberspacher catem GmbH & Co. KG, Herxheim (DE)

(72) Inventors: Franz Bohlender, Kandel (DE); Andreas Schwarzer, Frankfurt am Main (DE); Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 535 days.

(21) Appl. No.: 15/832,904

(22) Filed: Dec. 6, 2017

(65) Prior Publication Data
US 2018/0160480 A1  Jun. 7, 2018

(30) Foreign Application Priority Data

Dec. 6, 2016 (DE) ..................... 10 2016 224 296.2
Feb. 6, 2017 (EP) ..................... 17154764

(51) Int. Cl.
*F24H 1/12* (2006.01)
*F24H 9/20* (2006.01)
(Continued)

(52) U.S. Cl.
CPC ......... *F24H 9/2028* (2013.01); *B60H 1/2215* (2013.01); *B60H 1/2225* (2013.01);
(Continued)

(58) Field of Classification Search
CPC ........ F24H 9/2028; F24H 1/009; F24H 1/103; F24H 1/121; F24H 3/0429; F24H 9/1827;
(Continued)

(56) References Cited

U.S. PATENT DOCUMENTS 4,086,467 A    4/1978  Grant
5,293,844 A *  3/1994  Threatt .................. F24H 1/182
                                                122/19.2
(Continued)

FOREIGN PATENT DOCUMENTS

CN     201066202     5/2008
DE      19738318     3/1999
(Continued)

OTHER PUBLICATIONS

EP 3101364—English translation; machine translation, Feb. 2020 (Year: 2020).*

(Continued)

*Primary Examiner* — Benjamin R Shaw
(74) *Attorney, Agent, or Firm* — Boyle Fredrickson S.C.

(57) ABSTRACT

An electric heating device includes a casing that forms inlet and outlet openings for the fluid to be heated and a circulation chamber as well as a connection chamber separated from the circulation chamber by way of a partition wall. A heat-emitting surface of a PTC heating element is exposed in the circulation chamber and is coupled in a heat-conductive manner to a PTC element. The PTC element is in electrically conductive contact, which via electrical conductor tracks with different polarities that are electrically connected in the connection chamber. The casing is a plastic casing provided with a shielding.

10 Claims, 13 Drawing Sheets

(51) Int. Cl.
| | |
|---|---|
| *F24H 1/00* | (2006.01) |
| *H05B 1/02* | (2006.01) |
| *H05B 3/24* | (2006.01) |
| *B60H 1/22* | (2006.01) |
| *F24H 1/10* | (2006.01) |
| *F24H 9/18* | (2006.01) |
| *H05B 3/04* | (2006.01) |
| *F24H 3/04* | (2006.01) |
| *H05B 3/02* | (2006.01) |
| *H05B 3/14* | (2006.01) |
| *H05B 3/06* | (2006.01) |

(52) U.S. Cl.
CPC ............. *F24H 1/009* (2013.01); *F24H 1/103* (2013.01); *F24H 1/121* (2013.01); *F24H 3/0429* (2013.01); *F24H 9/1827* (2013.01); *F24H 9/1872* (2013.01); *H05B 1/0236* (2013.01); *H05B 1/0244* (2013.01); *H05B 3/02* (2013.01); *H05B 3/04* (2013.01); *H05B 3/06* (2013.01); *H05B 3/14* (2013.01); *H05B 3/141* (2013.01); *H05B 3/24* (2013.01); *B60H 2001/2278* (2013.01); *H05B 2203/02* (2013.01); *H05B 2203/023* (2013.01)

(58) Field of Classification Search
CPC ... F24H 9/1872; B60H 1/2215; B60H 1/2225; B60H 2001/2278; H05B 1/0236; H05B 1/0244; H05B 3/02; H05B 3/04; H05B 3/06; H05B 3/14; H05B 3/141; H05B 3/24; H05B 2203/02; H05B 2203/023
USPC .......................................................... 219/544
See application file for complete search history.

(56) References Cited

U.S. PATENT DOCUMENTS

| | | | |
|---|---|---|---|
| 8,012,575 B2* | 9/2011 | Muller .................. | D04H 1/407 428/297.4 |
| 8,183,505 B2* | 5/2012 | Niederer ............... | F24H 9/1827 219/520 |
| 8,946,599 B2 | 2/2015 | Niederer et al. | |
| 9,297,551 B2* | 3/2016 | Bohlender ............. | F24H 1/009 |
| 9,326,324 B2* | 4/2016 | Bohlender ............. | H05B 3/50 |
| 9,398,641 B2* | 7/2016 | Bohlender ............ | F24H 3/0441 |
| 10,098,183 B2 | 10/2018 | Bohlender et al. | |
| 10,302,331 B2 | 5/2019 | Kohl et al. | |
| 2005/0134158 A1* | 6/2005 | Bartmann ............. | F24C 15/026 312/319.2 |
| 2006/0049626 A1* | 3/2006 | Wilkendorf ........... | F16L 41/02 285/142.1 |
| 2008/0000889 A1* | 1/2008 | Niederer ............... | F24H 3/0464 219/205 |
| 2012/0085742 A1* | 4/2012 | Niederer ............... | H05B 3/24 219/201 |
| 2012/0085743 A1* | 4/2012 | Clauss .................. | H05B 3/24 219/202 |
| 2012/0087642 A1* | 4/2012 | Bohlender ............. | F24H 1/009 392/465 |
| 2013/0161306 A1* | 6/2013 | Bohlender ............. | H05B 3/02 219/202 |
| 2013/0161307 A1* | 6/2013 | Bohlender ............. | H05B 3/30 219/202 |
| 2013/0161308 A1* | 6/2013 | Bohlender ........... | B60H 1/2225 219/202 |
| 2013/0161316 A1* | 6/2013 | Bohlender ............. | H05B 3/50 219/531 |
| 2013/0230302 A1 | 9/2013 | Kominami et al. | |
| 2014/0319125 A1* | 10/2014 | Bohlender ............. | F24H 9/14 219/530 |
| 2015/0215994 A1* | 7/2015 | Bohlender ............. | B32B 37/18 219/540 |
| 2015/0343883 A1* | 12/2015 | Gu ........................ | F24H 9/1872 392/347 |
| 2016/0096140 A1* | 4/2016 | Marini .................. | F01N 3/2066 422/310 |
| 2016/0184846 A1* | 6/2016 | Pellin .................... | B05B 15/58 239/135 |
| 2016/0360572 A1* | 12/2016 | Bohlender ............. | H05B 3/18 |
| 2016/0360573 A1* | 12/2016 | Bohlender ............. | H05B 3/06 |
| 2016/0360574 A1* | 12/2016 | Bohlender ............. | H05B 3/06 |
| 2017/0295613 A1* | 10/2017 | Kim ...................... | F24H 9/2071 |

FOREIGN PATENT DOCUMENTS

| | | | |
|---|---|---|---|
| DE | 20 2009 009 942 U1 | 9/2010 | |
| DE | 202009009942 | 9/2010 | |
| DE | 102012025445 | 6/2013 | |
| EP | 1213197 | 6/2002 | |
| EP | 2607121 | 6/2013 | |
| EP | 2668450 | 12/2013 | |
| EP | 2 884 817 A1 | 6/2015 | |
| EP | 2884817 | 6/2015 | |
| EP | 3101364 A1 * | 12/2016 | ............. H05B 3/06 |
| FR | 2858166 | 1/2005 | |
| WO | 2014000666 | 1/2014 | |

OTHER PUBLICATIONS

U.S. Appl. No. 15/832,082, filed Dec. 5, 2017, for "Electric Heating Device and PTC Heating Element for Such".
U.S. Appl. No. 15/832,171, filed Dec. 5, 2017, for "Electric Heating Device".
U.S. Appl. No. 15/832,262, filed Dec. 5, 2017, for "Electric Heating Device".
U.S. Appl. No. 15/832,956, filed Dec. 6, 2017, for "Electric Heating Device and PTC Heating Element of an Electric Heating Device".

* cited by examiner

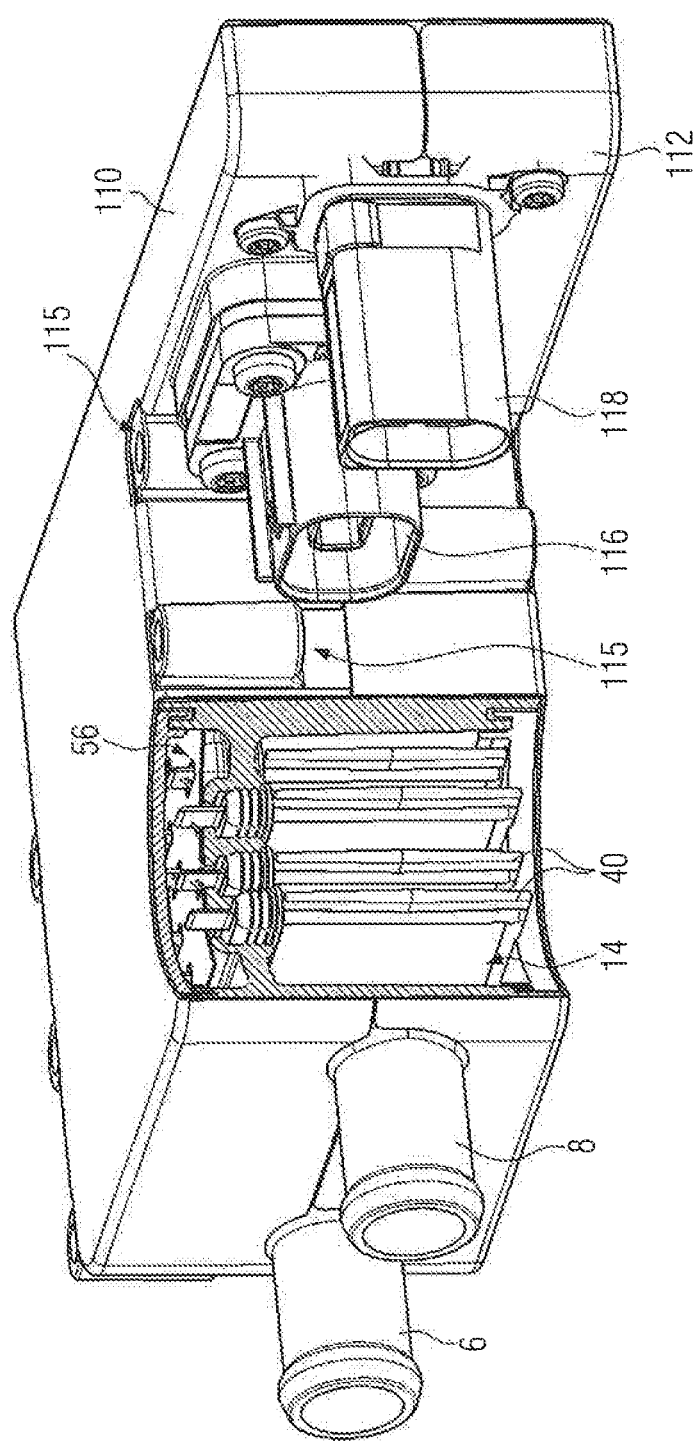

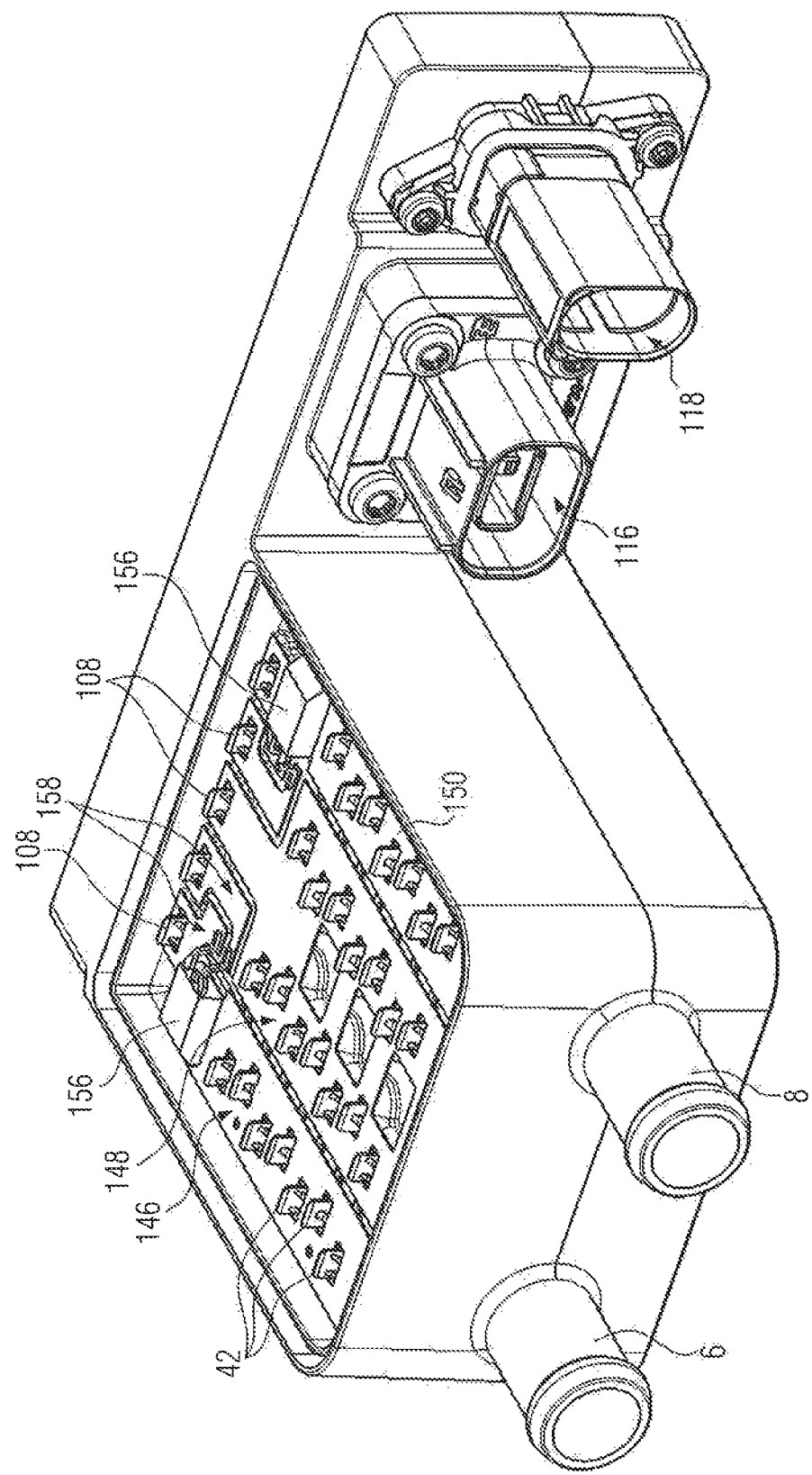

ELECTRIC HEATING DEVICE

BACKGROUND OF THE INVENTION

1. Field of the Invention

The present invention relates to an electric heating device with a casing that forms inlet and outlet openings for the fluid to be heated and a circulation chamber as well as a connection chamber separated from the circulation chamber by way of a preferably fluidically tight partition wall. A heat-emitting surface of a PTC heating element is exposed in the circulation chamber. This heat-emitting surface is coupled to a PTC element in a heat conductive manner. The PTC element is contacted in an electrically conductive manner by electrical conductor tracks to different polarities, which are electrically connected in the connection chamber.

2. Description of the Related Art

Such an electric heating device can be configured according to EP 1 768 459 A1 and can be used as an electric heating device for heating air. However, it can in particular be designed as a liquid heating device, as is known, for example, from EP 1 872 986 A1. In this prior art, heating ribs protrude into the circulation chamber, through which the liquid fluid to be heated is flowed. The heating ribs form a U-shaped pocket in which the PTC element as well as the conductor tracks and insulation layers each on the outer side of the conductor tracks are accommodated. The PTC elements and the conductor tracks, which abut thereagainst on both sides for energizing, are accommodated in the heating rib in an electrically insulating manner. The heating rib and the partition wall are there made of metal. The heat generated by the PTC element is passed via the walls forming the heating rib outwardly to the outer surface of the heating rib and there delivered to the liquid medium to be heated.

SUMMARY OF THE INVENTION

The present invention relates, in particular, to an electric heating device for heating a motor vehicle, in particular a passenger car. Accordingly, the electric heating device is a component which must be produced economically. Furthermore, it is generally to be observed with built-in components for motor vehicles that the built-in components need to be designed to be weight-optimized. In view of this, EP 2 797 381 A1, which is likewise to be considered as being generic, proposes an electric heating device with a casing which comprises a casing cover forming the partition wall, said casing cover is produced as an aluminum diecasting component and is sealingly placed on a casing lower part circumferentially surrounding the circulation chamber and designed as an injection-molded plastic member and is thereby reduced in weight.

However, though the solution last discussed can be produced more economically and is also reduced in terms of weight as compared to earlier proposals with a pure metal casing, demands remain unmet, in particular, with regard to electromobility and the increasing use of electric heating devices as liquid heaters in motor vehicles. The present invention seeks to provide an electric heating device which is light in weight and inexpensive to manufacture.

To solve this problem, the present invention proposes an electric heating device having a casing which forms the circulation chamber and the connection chamber, where the fluid to be heated flows in the circulation chamber, and the electrical connection of the PTC heating element to the power current is effected in the connection chamber. It goes without saying that several PTC heating elements can be provided in the circulation chamber. They can be grouped to heating circuits in a known manner within the connection chamber by way of an electrically conductive plate or circuit board. This electrically conductive plate or circuit board can be distinguished by the absence of any electronic components and serves merely to group the individual PTC elements into heating circuits. It can, in particular, be configured according to EP 2 505 931 A1. In parallel thereto, a further electrically conductive plate or circuit board can be provided in the connection chamber which can be equipped with components in order to process or control the control current and/or the power current to the individual PTC heating elements.

The present invention is distinguished from prior art in that the casing is a plastic casing. Accordingly, the circulation chamber and the connection chamber as well as the partition wall separating the two chambers, which is preferably a fluidly tight partition wall, are largely completely surrounded by plastic walls. The walls which surround the connection chamber at least circumferentially, the walls circumferentially surrounding the circulation chamber, and the partition wall usually extending at a right angle thereto, are formed from plastic material. This part of the casing can be designed as an integrally formed casing base element, i.e. as an integrally formed component produced by way of injection molding. The cover covering the circulation chamber and/or the connection chamber on the upper side can also be made of plastic material, so that the connection chamber as a whole and the circulation chamber as a whole is/are formed and defined by plastic components. However, the casing cover can possibly also be made of a thin metal plate which contributes only insignificantly to increasing the dead weight of the casing.

According to the present invention, the plastic casing is further provided with a shielding. This shielding encloses the casing substantially entirely circumferentially to provide effective EMC protection for the electric heating device. The switching operations performed in the electric heating device then do not lead to any significant electromagnetic interference within the vehicle. The shielding is preferably provided with a ground connection. This ground connection is embodied in the form of an object in form of a ground interface, for example, in the form of a plug contact element or an attachment eyelet. The electric heating device can be connected via this ground connection to the minus pole of the vehicle after installation in the vehicle. The ground connection is commonly exposed on the outside of the casing. It can also be part of the attachment of the casing to the vehicle, so that the ground connection is established when a mounting bolt or screw is connected to the casing of the electric heating device to mount the electric heating device to the vehicle.

The plastic casing can be penetrated by a ground monitor connection, which, for example, projects into the circulation chamber in order to verify whether the electrical insulation of the PTC heating element within the circulation chamber is functional. Such a ground monitor can be exposed as a connector pin on the exterior of the casing of the electric heating device. The ground monitor can be provided, for example, in combination with an attachment eyelet with which the electric heating device is mounted and attached to a motor vehicle. The ground connection is commonly electrically coupled to the shielding of the casing. A ground monitor connection has no function of being used to electrically supply the PTC elements. It merely verifies the electrical insulation of the PTC element against the casing or the fluid to be heated.

The ground monitor can be connected in an electrically conductive manner within the casing to the aforementioned ground terminal. The conductor path can be effected, for example, via the shielding of the casing.

In addition to the connection chamber, a control chamber, in which a control device is accommodated, can be formed by the plastic casing. This control device, which is provided as a structural unit with the actual heating part, is in terms of control operation coupled to the PTC heating element. An electrical connection, for example, in the form of a plug contact is commonly provided between a conductive plate forming the heating circuits and a circuit board of the control device. Such an electrical connection can be formed, for example, by a current bar which is sealingly received in the wall of the plastic casing by way of overmolding. The plastic casing is preferably formed from crosslinked plastic material, in particular, duroplastic material. The plastic casing is therefore preferably not formed from thermoplastic material. Crosslinked plastic material in a particular way offers the possibility of accommodating the current bar in a sealing manner in the wall of the plastic casing. The wall, which is penetrated by the current bar, can also be formed by the partition wall in order to electrically connect, for example, one or more PTC heating elements within the circulation chamber. The corresponding development can also by itself be essential to the invention. According to a preferred embodiment of the present invention, the shielding is formed by a metal mesh integrated in the plastic casing. In this preferred development, the shielding is regularly not located on the outer side of the casing. Instead, the shielding is provided within the casing, i.e., for example, lining the respective chambers or accommodated in the plastic casing by overmolding. For attaching it, the shield can be connected to the plastic casing in a simple manner by overmolding the plastic material forming the plastic casing.

According to a preferred development of the present invention, the casing accommodates a control device which is surrounded circumferentially by the shielding. This part of the shield, as well, can be formed by an integrated metal mesh.

Alternatively, the shielding can also be formed by a metal casing enclosing the plastic casing on the outside. This metal casing can be made of mesh material for weight reduction. Alternatively, a continuous metal sheet can also form the metal casing.

This metal casing is preferably formed from at least two shell elements which receive between them the inlet and outlet ports of the casing which form the inlet and outlet openings.

The metal casing can comprise recesses through which attachment projections protrude over the outer surface of the metal casing, where these attachment projections are formed by the plastic casing and serve to attach the electrical heating device to the vehicle, for example, to receive attachment bolts or screws therein.

The casing can comprise a casing base member formed from plastic material, which forms the partition wall and walls that circumferentially surround the circulation chamber and the connection chamber. This casing base member is designed as an integrally formed component. It forms the base of the casing, which is made of plastic material, preferably entirely of plastic material. The circulation chamber and the connection chamber are basically defined by the casing base member. Only covers on the end side need to be placed on the casing base member in order completely close off, firstly, the circulation chamber and, secondly, the connection chamber. The casing base member also forms the inlet and outlet openings to the circulation chamber, particularly preferably in the shape of connection ports for connecting a hose or tube for liquid.

In a cross-sectional view, the casing base member is preferably formed to be H-shaped, where the cross bar of the H is formed by the partition wall which defines the connection chamber on one side and the circulation chamber on the other side. Furthermore, a divider extending substantially perpendicularly from the partition wall and dividing the circulation chamber into an inlet circulation chamber and an outlet circulation chamber can be formed by the casing base member. Due to this divider, two heating chambers are formed within the circulation chamber in each of which at least one PTC element is disposed, where one of the heating chambers is in direct communication with the inlet opening and the other of the heating chambers with the outlet opening. Provided therebetween is commonly a connection channel. It can be formed by a channel wall that extends at a right angle to the partition wall and extends at a right angle to the divider, and is likewise formed as part of the casing base. The divider and the channel wall can be continued by corresponding wall segments which can be formed by a casing cover that covers the circulation chamber. Such a casing cover, however, usually rests with its outer circumferential surface directly on the walls surrounding the circulation chamber and formed by the casing base.

Due to the casing base member, the present invention therefore provides the possibility of forming the central element of the heating device as an integrally formed component. The casing base member can then form plug-in receptacles for the sealing arrangement of PTC heating elements, which are first attached to the partition wall by being plugged on.

The heating device according to the invention also comprises a control chamber for accommodating a control device which is designed as a structural unit together with the power component of the electric heating device. The power component is then, in particular, formed by the circulation chamber and the PTC heating elements accommodated therein. This control chamber can be formed together with the connection chamber. In this case, the electric heating device has only two chambers. Alternatively, the control chamber can also be configured as chamber separate from the connection chamber. In this case, the connection chamber accommodates, for example, only electrically conductive plates or circuit boards which serve to group individual PTC heating elements to a heating circuit. A printed circuit board fitted with electronic components is then not accommodated in the connection chamber. Such a printed circuit board is provided separately for this purpose in the control chamber. This control chamber is formed by the casing. According to a preferred development of the present invention, the casing base member also forms the walls circumferentially surrounding the control chamber. In this preferred development, at least three different chambers [are given], each of which is assigned a particular function, namely heating the preferably liquid fluid to be heated (circulation chamber), grouping the PTC heating elements to heating circuits (connection chamber), and finally, processing or controlling control signals and power current (control chamber).

The casing base member is preferably formed from cross-linked plastic material, i.e. no thermosetting material, but, for example, duroplastic material. The selection of this material leads to a specific technical effect, provided that a current bar is provided extending between two different chambers of the electric heating device and accommodated into the casing base member by way of overmolding. In this case, the current bar is sealingly accommodated in the casing base member by overmolding, i.e. in a wall which separates one connection chamber from the other connection chamber. The current bar preferably forms contact strips on oppositely disposed ends for plugging on a conductive plate or a circuit board. As a result, electrical conductor tracks, for example, of a printed circuit board or of an electrically conductive plate, can be plugged onto the current bar in a simple manner. It has been found that duroplastic material establishes a close and sealing connection to the current bar after overmolding.

The respective wall can be formed by the partition wall between the circulation chamber and the connection chamber. However, it can also be formed by a wall which extends between the connection chamber and the control chamber.

Such a wall is preferably configured as a control chamber base by the casing base. Such a control chamber base preferably has a passage opening into which a cooling element is sealingly inserted. The cooling element is coupled with its one end to the circulation chamber in a thermally conductive manner and with its other end within the control chamber to a component of the control device generating thermal dissipation loss. The cooling element can be entirely made of metal, for example, aluminum or copper. In the case where the control chamber is identical to the connection chamber, the control chamber base presently mentioned corresponds to the partition wall, which is provided between the circulation chamber and the connection chamber, and is in this case provided with the passage opening.

According to a preferred development of the present invention, the cooling element is exposed in a cooling channel of the circulation chamber. This cooling channel can be the previously mentioned connection channel which is within the circulation chamber and separated from the heating chamber by a channel wall. Arranging the end of the cooling element to be cooled behind the channel wall results in radiation shielding between the cooling element and the PTC heating element provided in the circulation chamber. The cooling element is therefore not directly exposed to the radiant heat emitted by the PTC heating element. This formulation is intended to express the fact that the end of the cooling element to be cooled, though being exposed in the circulation chamber, does not "see" any PTC element.

The cooling element is preferably held in the passage opening by way of a bayonet lock. The cooling element can then be designed as a substantially cylindrical component, which is protruded on oppositely disposed circumferential segments by locking projections, which, after the bayonet lock has been joined, generally abut against one of the walls circumferentially surrounding the circulation chamber, whereby the cooling element is locked. It goes without saying that the passage opening must be provided with axially extending grooves which are designed to have the locking projections pass through, as is customary with a bayonet-type lock. For joining the cooling element, the latter is commonly inserted from the control chamber side in the direction toward the circulation chamber, commonly entraining and incorporating a sealing element, for example, in the form of a sealing ring, which seals the cooling element against the wall defining the passage opening. On its side facing away from the circulation chamber, the cooling element commonly has a collar which abuts against an edge defining the passage opening on the control side.

In the above-discussed development with a circulation chamber, a connection chamber, and a control chamber, where the connection chamber and the control chamber are provided separate from each other, the casing base member preferably forms a first plastic tub which forms the circumferential surfaces of the circulation chamber, a second plastic tub, which forms the circumferential surfaces of the connection chamber, and a third plastic tub, which forms the circumferential surfaces of the control chamber. As already mentioned, the first and the second plastic tubs usually share a base formed by the partition wall. The first and the second plastic tubs are therefore open to oppositely disposed sides and separated from each other by the partition wall. The third plastic tub extends at a right angle to the first and the second plastic tubs. Accordingly, the main direction of extension of a casing cover that covers the third plastic tub is perpendicular to the main direction of extension of the casing cover that covers the first and the second plastic tubs. The base of the third plastic tub is then commonly formed by a wall segment that is formed by the casing base member and that forms a circumferential wall of the connection chamber and a circumferential wall of the circulation chamber commonly in straight-line extension.

Each of the aforementioned casing covers to the connection chamber, the circulation chamber and the control chamber, respectively, is preferably made of plastic material, particularly preferably of duroplastic material. For the tight connection between the respective casing cover and the casing base member, the walls circumferentially surrounding the connection chamber, the circulation chamber and/or the control chamber are provided with a circumferential groove on the face side. Adhesive, in particular, epoxy adhesive, is introduced into this groove before the respective casing cover is joined. The casing cover has a circumferential rim which is introduced into the circumferential groove and, together with a further ridge running in parallel thereto, forms a mating groove into which commonly an inner ridge engages, which defines the circumferential groove, whereafter a kind of labyrinth seal is formed, which is substantially completely filled by adhesive after pressing the casing cover on due to the volumetric dosing of the adhesive into the groove.

According to a preferred development of the present invention, a current bar extending between two different chambers is provided and is sealingly accommodated in the casing base member by way of overmolding. The latter is, in particular for this preferred embodiment, formed from duroplastic material. The duroplastic material encloses and seals the current bar within the material such that a reliable seal is provided between the two chambers along the outer surface of the current bar.

Such a configuration can be provided, for example, between the control chamber and the connection chamber, penetrating a control base. Such a control chamber base defines the control chamber on the underside and forms a wall circumferentially surrounding the connection chamber. In the development of the present invention, the current bar thus provided is embodied as a connection element between a circuit board received in the control chamber and the connection chamber. The current bar can be provided as a plug element and can be electrically contacted by, firstly, plug-on contacts to the printed circuit board and, secondly, a conductive plate provided within the connection chamber. This plate can be configured like in EP 2 505 931 A1. Within the connection chamber, the plug-on contact formed by the current bar preferably extends parallel to contact strips of the PTC heating element so that the plug-on contact to the PTC heating element and the plug-on contact to the current bar can be effected by plugging on an electrically conductive plate in a predetermined direction, commonly by lowering the conductive plate into the connection chamber.

According to a preferred embodiment of the present invention, the cooling element is sealingly accommodated in the casing by way of overmolding. In this embodiment as well, the casing is preferably formed from duroplastic material. On its outer circumferential surface, the cooling element can comprise one or more regularly circumferentially extending attachment collars, which together with the solidified plastic material of the casing form a labyrinth seal and accordingly improve both the reliable attachment of the cooling element in the casing as well as the tightness. During overmolding, a surface of the cooling element facing the connection chamber can be covered entirely or partially by plastic material forming the casing in order to provide an electrically insulating contact surface for a power transistor that is connected to the cooling element in a heat-conducting manner in order to dissipate the thermal dissipation loss produced by the power transistor to the medium to be heated within the circulation chamber. The insulation can be formed integrally with the casing as a thin film. This makes arranging a separate electrical insulation between the cooling element and the power transistor unnecessary. Production is simplified.

BRIEF DESCRIPTION OF THE DRAWINGS

Further details and advantages of the present invention shall become apparent from the following description of an embodiment in combination with the drawing, in which:

FIG. 9 shows a perspective and partially exposed side view of the second embodiment with a shielding provided on the plastic casing;

FIG. 14 shows a perspective side of a further embodiment with the casing cover removed;

DETAILED DESCRIPTION

1. Basic Configuration of the Heating Device

Figure 1:
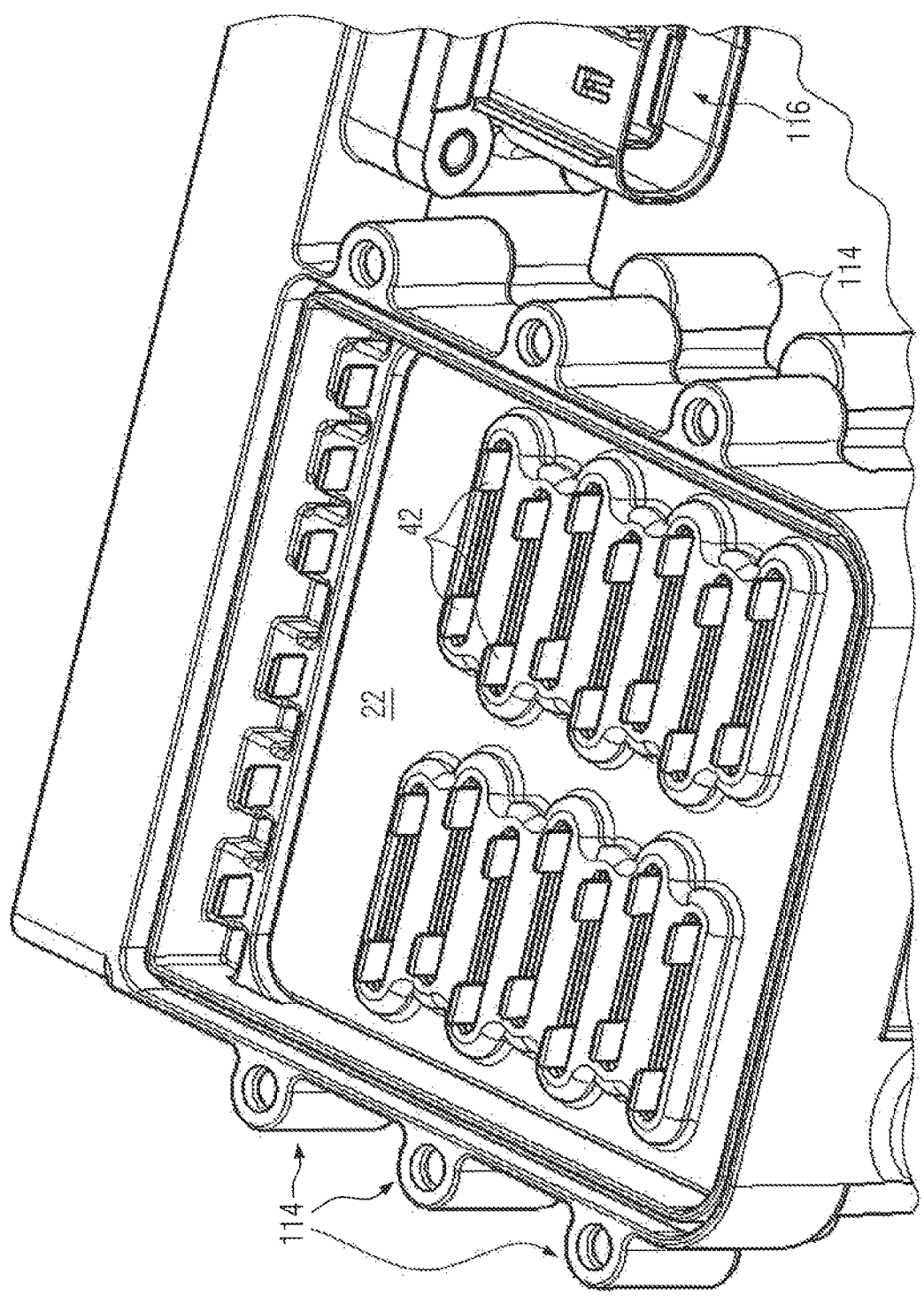
FIG. 1 shows a perspective top view onto a first embodiment of a casing.

FIG. 1 shows a perspective top view of a casing, designated by reference numeral 2, of an electric heating device configured as a water heater. The casing 2 has a casing tub element 4 made of plastic material. This plastic material is presently duroplastic material. The casing 2 forms an inlet port 6 and an outlet port 8 which are presently embodied formed integrally on the casing tub element 4. The ports 6, 8 are designed as hose connection ports and form an inlet opening 10 and an outlet opening 12, respectively, to a circulation chamber designated by reference numeral 14. The circulation chamber 14 is divided into two heating chambers, of which only the heating chamber 16 shown in the front of the representation can be seen in FIGS. 1 and 2. The circulation chamber 14 is divided by a dividing wall 20, which is formed integrally on the casing tub element 4 and protrudes inwardly from the base 18 thereof, and which is continued by a further dividing wall 24 identified by reference numeral 24 and formed on a cover plate designated by reference numeral 22. On the side disposed opposite to the two nozzles 6, 8, the two heating chambers 16 are connected to one another by way of a connection channel which can be seen in the second embodiment of a casing 2 according to FIG. 5 and is designated there by reference numeral 26. This connection channel 26 is separated from the heating chamber 16 by a channel wall segment 28, which is integrally formed on the cover plate 22 and extends at a right angle to the partition wall 20, and a channel wall segment 30 which projects from the base 18 of the casing tub element 4.

The cover plate 22 is made of plastic material. In the present case, the cover plate 22 is made of duroplastic material. In principle, the use of duroplastic material for producing the casing 2 or parts thereof has the advantage that duroplastic material exhibits relatively high temperature stability of about 150° C. and also shows no brittleness at temperatures of −40° C. This results in better temperature resistance for a casing formed entirely or partially from duroplastic material, for requirements which arise during heating operation and when operating vehicles in arctic regions. However, duroplastic material is also preferable over thermosetting materials because duroplastic material has better resistance against leakage current than thermosetting material.

Figure 4:
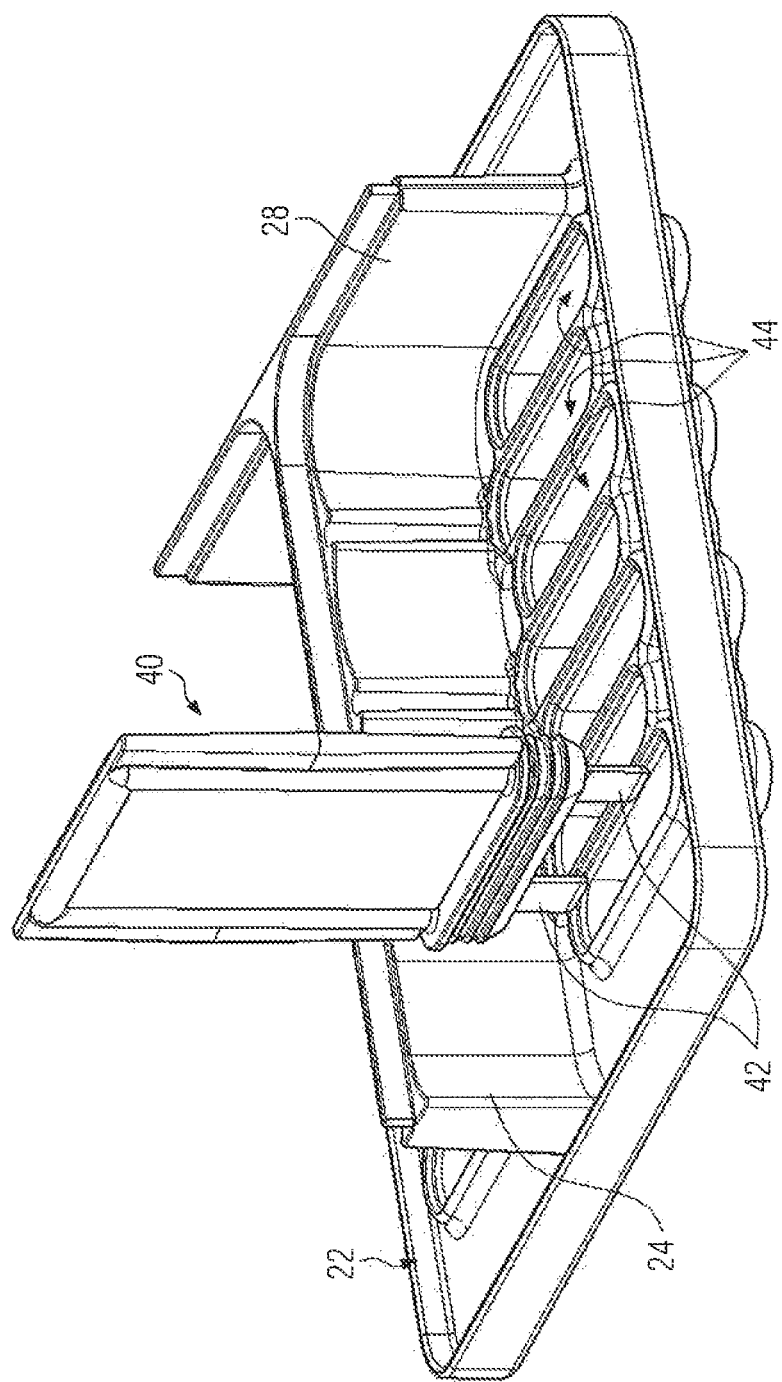
FIG. 4 shows the cover plate shown in FIG. 3 when being fitted with a PTC heating element.

FIG. 4 shows the cover plate 22 without the casing tub element 4. The cover plate 22 has a circumferential edge 32 which interacts with a circumferential groove 34 formed on the casing tub element 4. This groove 34 is filled with adhesive, in the present case epoxy glue, before the edge 32 penetrates into the groove 34 in order to adhesively bond the cover element 22 to the casing tub element. The segments 24 and 28 are joined to the corresponding wall elements 20 and 30, respectively, of the casing tub element 4 in the same way. The circulation chamber 14 is then sealed in a fluidly tight manner between the base 18 of the casing tub element 4 and the cover element 22 and circumferentially surrounded by walls formed by the casing tub element 4 and extending at a right angle to the base 18 thereof.

Figure 3:
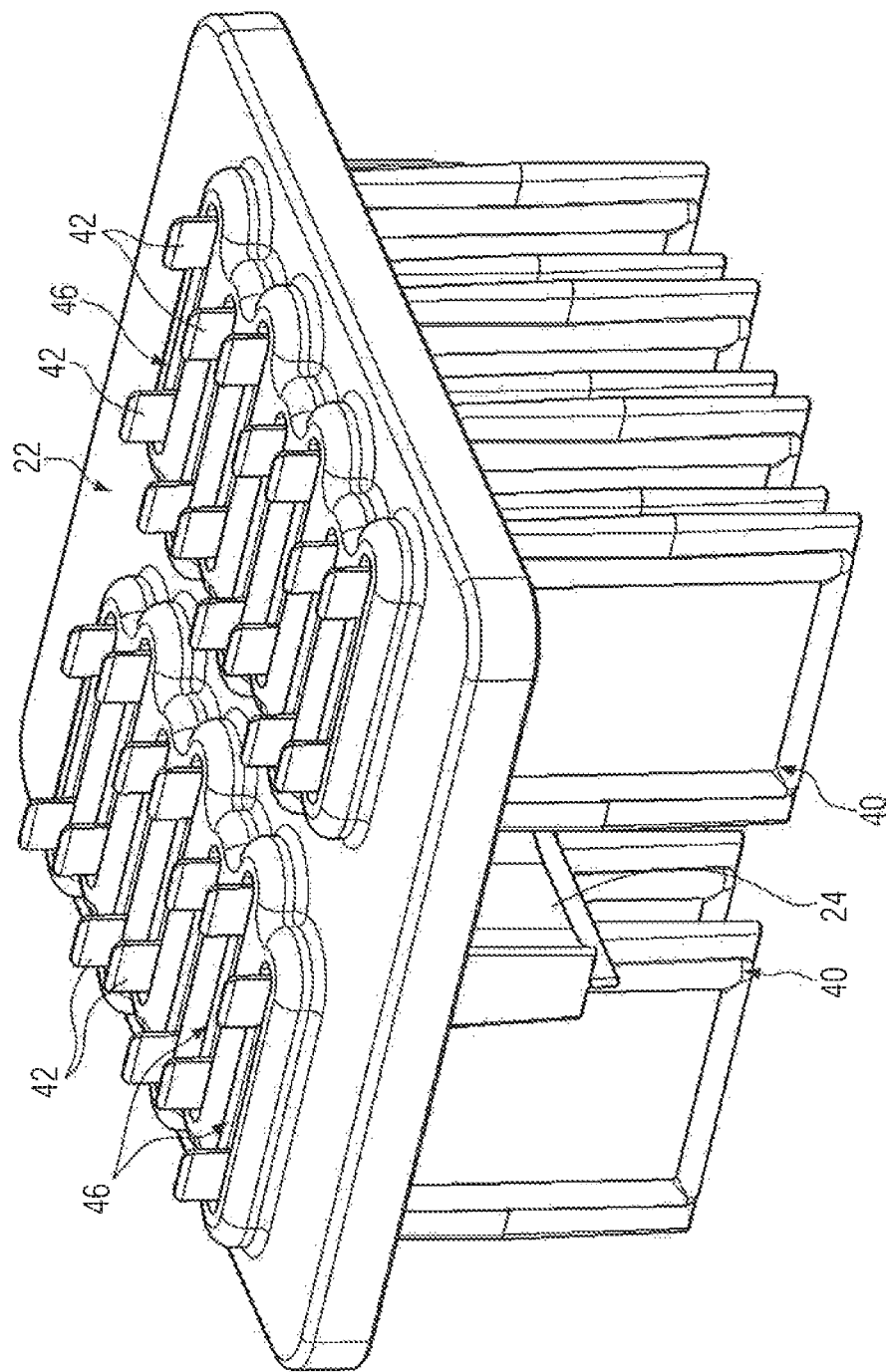
FIG. 3 shows a cover plate 22, provided in the first embodiment, in isolated representation together with PTC heating elements.

Prior to assembly, the cover element 22 is fitted PTC heating elements 40 in the manner shown in FIGS. 3 and 4. For this purpose, the PTC heating elements 40 are inserted on the connection side, i.e. where the PTC heating elements 40 each have two contact strips 42, into female plug element holding fixtures 44 which are integrally formed in the cover plate 22. These plug element holding fixtures 44 are each provided with a longitudinal slot 46 which is penetrated by the contact strips 42 (cf. FIGS. 1, 3). A longitudinal slot 46 is an example of a through-hole opened in the cover plate 22 as an example of an inner wall.

FIG. 4 illustrates the insertion of the PTC heating element 40 into the plug element holding fixture 44. For the plug connection established after insertion, the PTC heating element 40 has a sealing collar 48 which is configured to be adapted to the dimension of the plug element holding fixture 44 and is formed from elastomeric material which is sealingly injected into the plug element holding fixture 44, so that the slots 46 are sealed fluidly tight against the circulation chamber 14. Furthermore, by injecting the material forming the sealing collar 48, the PTC heating element 40 is held frictionally engaged within the plug element holding fixture 44, namely, also in the direction of insertion, which corresponds to the direction of longitudinal extension of the contact strips 42. Joined in this manner, the PTC heating elements 40 adhere to the cover plate 22 even if the latter with the plug element holding fixtures 44 is oriented downwardly, as shown in FIG. 3.

2. Casing Base Member

Figure 5:
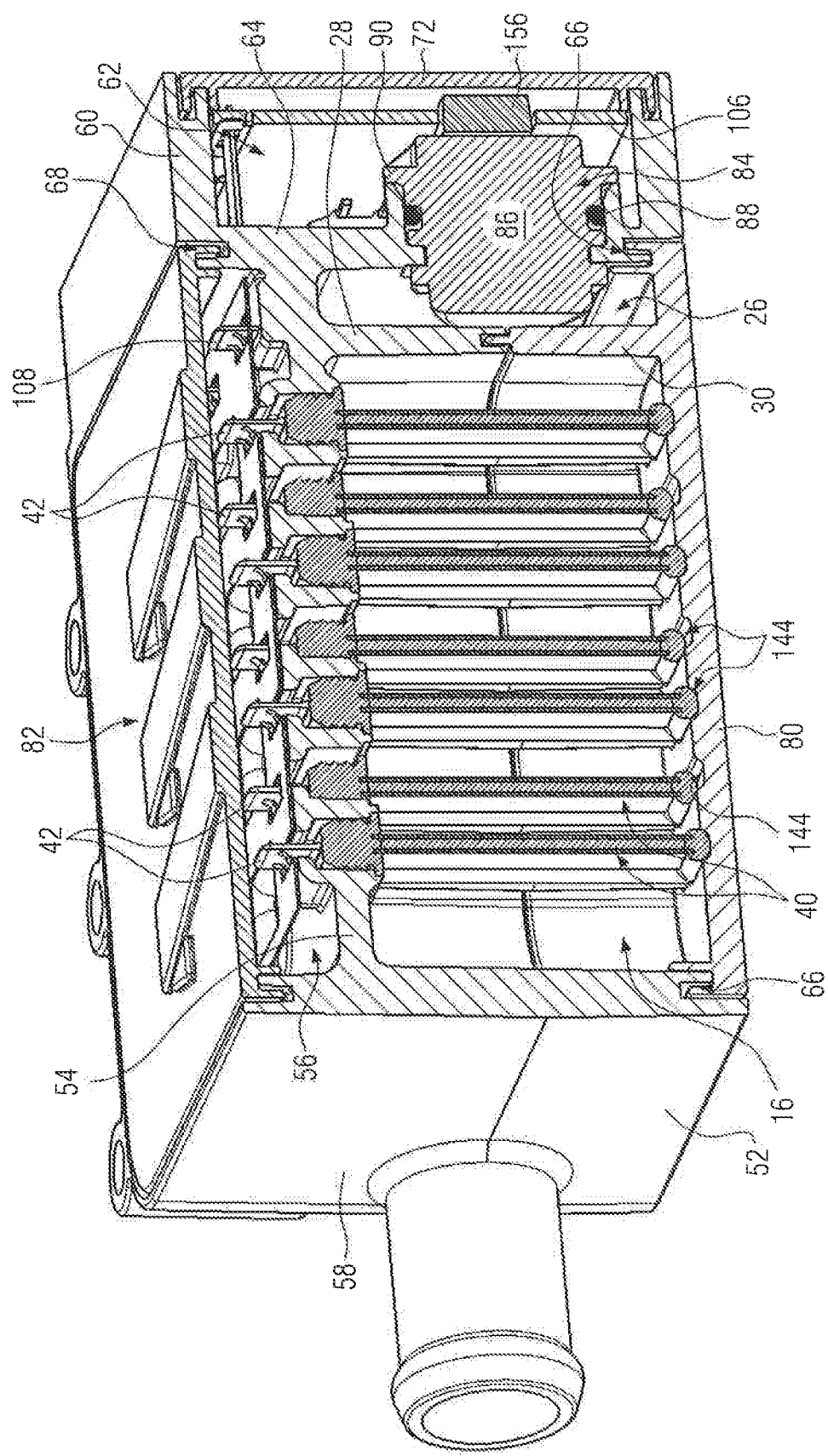
FIG. 5 shows a perspective sectional side view of a second embodiment of the present invention.

FIG. 5 in a sectional view illustrates the nature of an embodiment of a casing base member which is designated by reference numeral 50. The casing base member 50 forms walls that are designated by reference numerals 52 and surround the circulation chamber 16 circumferentially, i.e. the heating chambers 16 and the connection channel 26. The cover plate 22, which is provided as a separate component in the previously described embodiment, is presently embodied integrally with the casing base member 50 and presently also forms a partition wall 54, like in the first embodiment, which separates the circulation chamber 16 from a connection chamber 56 in which presently all contact strips 42 of all the PTC heating elements 40 are exposed. Walls designated by reference numeral 58 and surrounding the connection chamber circumferentially are also formed by the casing base member 50. Finally, in the extension of the ports 6, 8 and in this direction behind the circulation chamber 16 or the connection chamber 56, respectively, walls 60 are formed by the casing base member 50 and surround a control chamber 62 circumferentially. A control chamber base, designated by reference numeral 64, from which the walls 60 rise, is in part formed by one of the walls 52 and one of the walls 58. In a cross-sectional view extending parallel to the direction of extension of the nozzles 6, 8, the casing base member therefore accordingly appears to have an H-shaped cross-section with a U adjoining at one side of the H. The casing base member 50 is made of plastic material and configured as an integrally formed component. The casing base member 50 is presently formed from duroplastic material.

The walls 52, 58, 60 are each provided with a circumferential groove 66, 68, 70 on the face side. The function of these grooves 66, 68, 70 is illustrated in particular by FIG. 6. A cover element 72 to the control chamber 62 is there illustrated, which is configured as a substantially flat plate with a circumferential rim 74. This rim 74 engages in the associated groove 70 and displaces adhesive applied there (in the present case, epoxy adhesive). The rim 74 forms an outer edge of a mating groove 76 which is formed on the cover element 72 and is defined on the inside by an inner ridge 78. A kind of labyrinth seal is formed thereby, into which displaced adhesive can ingress, which has been introduced either into the groove 70 or the mating groove 76 prior to the installation of the cover element 72. Correspondingly, the casing cover 80 to the circulation chamber 14 and 82 to the connection chamber 56, respectively, is formed on the edge side and attached to the casing base member 50 and sealed against it.

Figure 6:
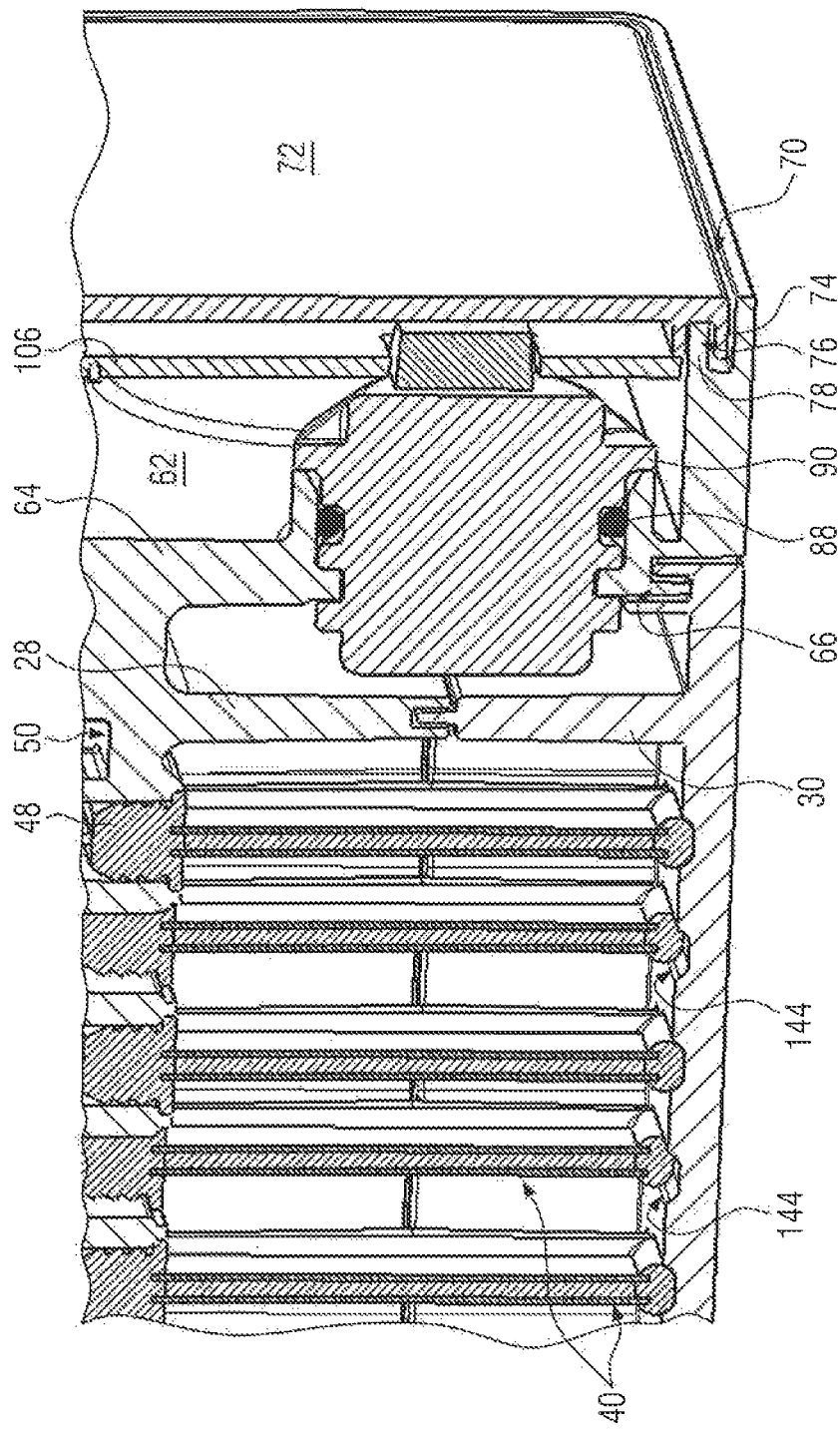
FIG. 6 shows detail VI according to the representation in FIG. 5.

As also illustrated in FIG. 6, the control chamber base 64 is provided with a passage opening 84 into which a cooling element 86 is introduced. A sealing ring 88 is provided between the cooling element 86 and the inner circumferential wall of the passage opening 84 for sealing the circulation chamber 14 against the control chamber 62. On the control casing side, the cooling element 86 forms an annular stop 90 which abuts against the face side end surface of the passage opening 84, which is extended in the direction towards the control chamber 62 as a projecting collar 92 and formed by the material of the casing base member 50.

Figure 7:
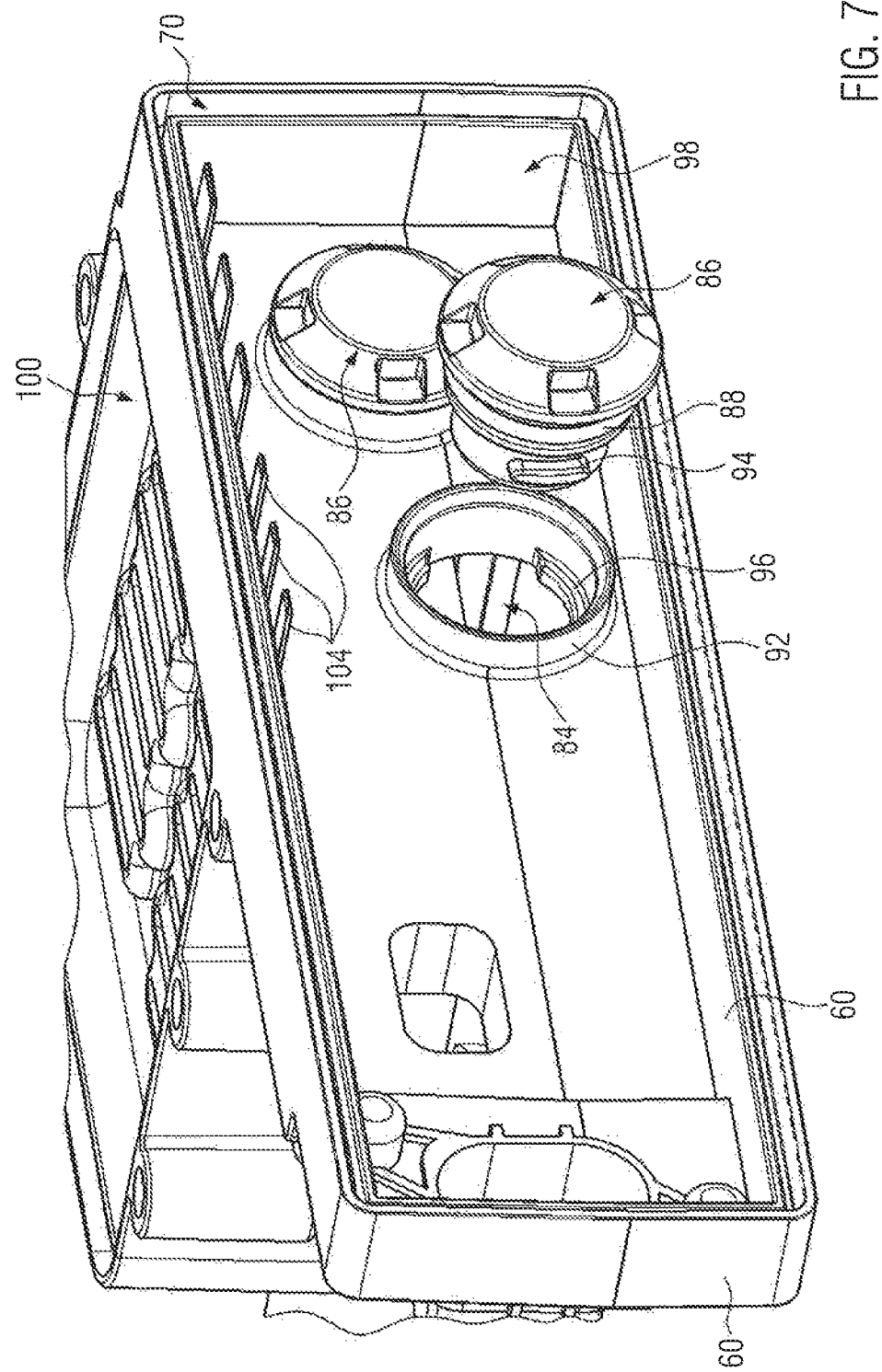
FIG. 7 shows a perspective view into the control tub of the second embodiment.

As shown in FIG. 7, the outer circumferential surface of the cooling element 88, which is formed substantially cylindrical at least in the direction toward the circulation chamber 14, is protruded circumferentially on opposite sides by locking projections 94, which interact with locking catches 96, which at the inner circumference project over the substantially cylindrical passage opening 84 to form a bayonet lock with which the cooling element 86 is fixed with respect to the casing base member 50. The sealing ring 88 can be configured such that it holds this lock subject to axial and/or radial pretension. In addition, the control chamber base 64 can be provided with depressions adjacent to the mouth of the passage opening 84 on the sides of the circulation chamber 14 into which the locking projections 94 engage and which hold the cooling element 86 in a positive-fit anti-rotational manner in order to prevent the bayonet lock 94, 96 from being released unintentionally.

FIG. 7 provides a view into a control casing tub which is formed by the control chamber base 64 and the walls 60 and which is closed by the cover element 72 in the final assembled state.

FIG. 5 shows, above the partition wall 54, a connection tub 100 formed by the partition wall 54 and the walls 58. On the side which is in the representation according to FIG. 5 located therebeneath, a circulation pan 102 is formed by the partition wall 54 and the walls 52 through the casing base member 50. The casing base member 50 forms substantially all the chambers 14, 56, 52, which only need to be covered by the cover elements 72, 80, 82, in order to create an electric heating device which is operational and formed as a lightweight plastic part.

3. Sealing Overmolded Current Bar

Figure 8:
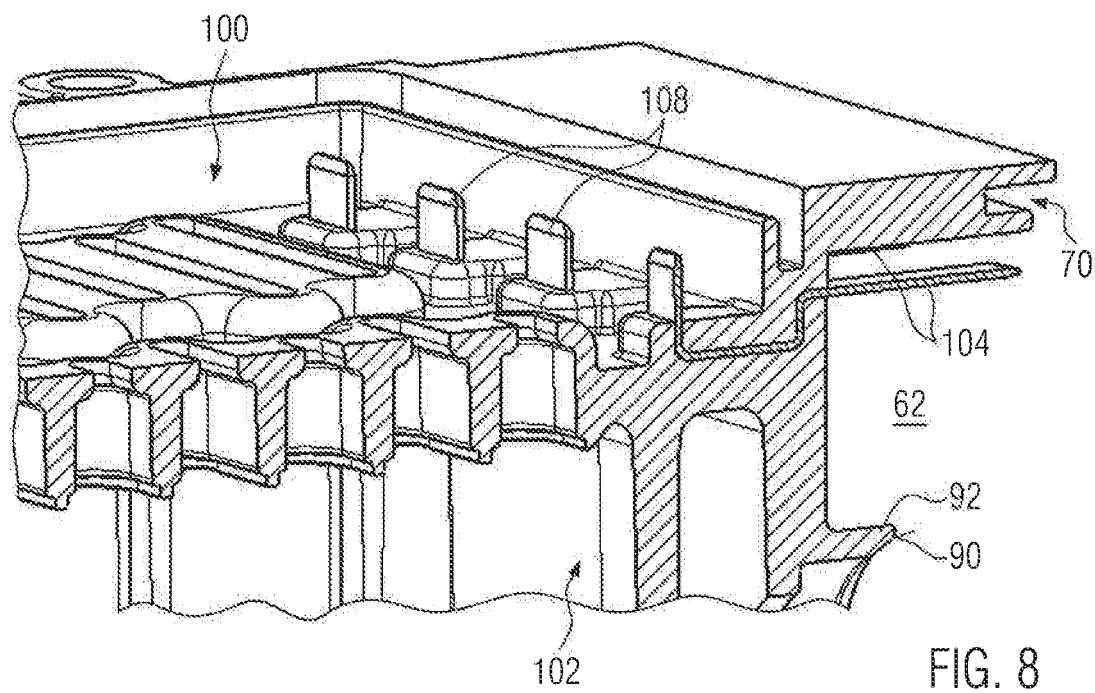
FIG. 8 shows a perspective longitudinal sectional view taken along line VIII-VIII according to the representation in FIG. 7.

FIG. 8 illustrates a current bar 104 which is provided as a conductor track between the connection chamber 56 and the control chamber 62. The current bar 104 is bent twice by 90° in opposite directions at the height of the control chamber base 64 and within the latter. One end of the current bar 104 located within the control chamber 62 is configured as a plug connection for a printed circuit board assembly 106 provided within the control chamber (cf. FIG. 6). The other end is provided within the connection chamber as a connection strip 108 for a distributor plate provided inside the connection chamber and omitted in the previous figures. The distributor plate can be configured like in EP 2 505 931 A1. Several connection strips 108 are exposed within the connection chamber 56 by several current bars 104 provided in an identical manner. The connection strips 108 extend parallel to the contact strips 42 to the PTC heating elements. The distributor plate can there be lowered into the connection chamber from above in order to contact all contact and connection strips 42, 108.

4. Shielding

The sheet metal strips 128 are formed from punched sheet metal and represent embodiments of contact plates.

FIG. 9 shows a partial sectional view of the casing 2 described above. This plastic casing 2 is surrounded by two metal shells 110, 112 which form a shielding for the electric heating device so that electromagnetic radiation cannot be emitted from the latter. The dividing plane of the metal shells 110, 112 is located approximately at the center height of the two nozzles 6, 8. The metal shells 110, 112 substantially completely surround the casing 2. Only attachment projections 114 formed on the plastic casing 2 project outwardly beyond the metal shells 110, 112 and through recesses 115 formed on the metal shells 110, 112 and through the shielding formed thereby. Furthermore, connector casings protrude which are designated by reference numerals 116 and 118, where the connector casing 116 is presently provided for the high-voltage power current and the connector casing 118 for the low-voltage control lines. The embodiment shown in FIG. 9 allows for the attachment of the casing 2 by way of the attachment elements 110 made of plastic material. In using them, the requirement to fasten the casing 2 at the desired location within a motor vehicle can be complied with in a simple manner. In FIG. 9, the metal shells 110, 112 are formed to be substantially end-to-end. They can just as well be formed from a perforated plate without the effect of the metal shells 110, 112 as an EMC protection being lost.

5. PTC Heating Element as a Frame Element

Figure 10:
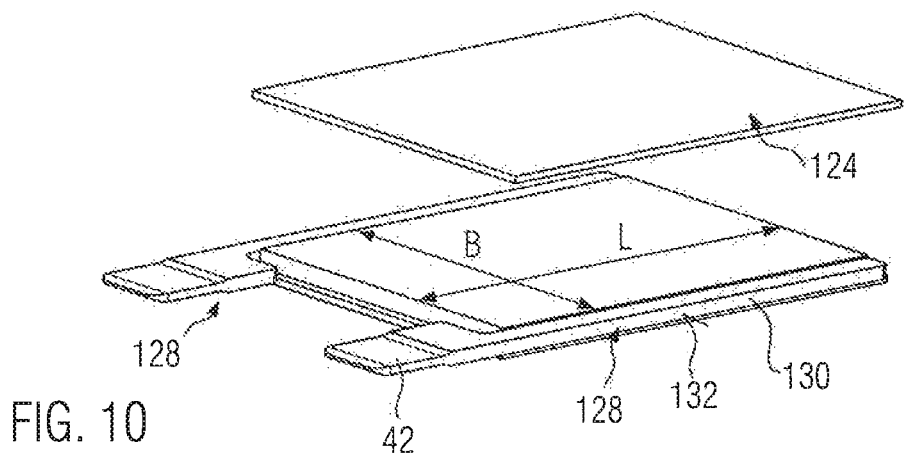
FIG. 10 shows a perspective side view of parts of the PTC heating element.

FIG. 10 shows a PTC element 120 which is provided with an insulation layer 124 on its oppositely disposed main side surfaces 122. The insulation layer 124 is presently a ceramic plate made from aluminum oxide. However, it can also be applied as a coating onto the PTC element 120 or as a combination of a coating with a single or multiple layer insulation coat. The PTC element 120 is designed as a platelet having a width B or a length L, respectively, that is greater by the factor of at least 10 than the thickness D which corresponds to the distance between the two main side surfaces 122. Sheet metal strips 128 substantially extending in the direction of the length L are provided on mutually oppositely disposed face side surfaces 126 and are glued to the PTC element 120 and are connected in an electrically conductive manner to a surface metallization of the PTC element 128, which can be applied as a protection by way of PVD or CVD. These sheet metal strips each form conductor tracks to different polarities with which the PTC element 120 is energized. The sheet metal strips 12 consist of a contact ridge 130 which is relatively narrow and the contact strip 42 which is widened in relation to the contact ridge 130 in the direction of the width B.

Figure 11:
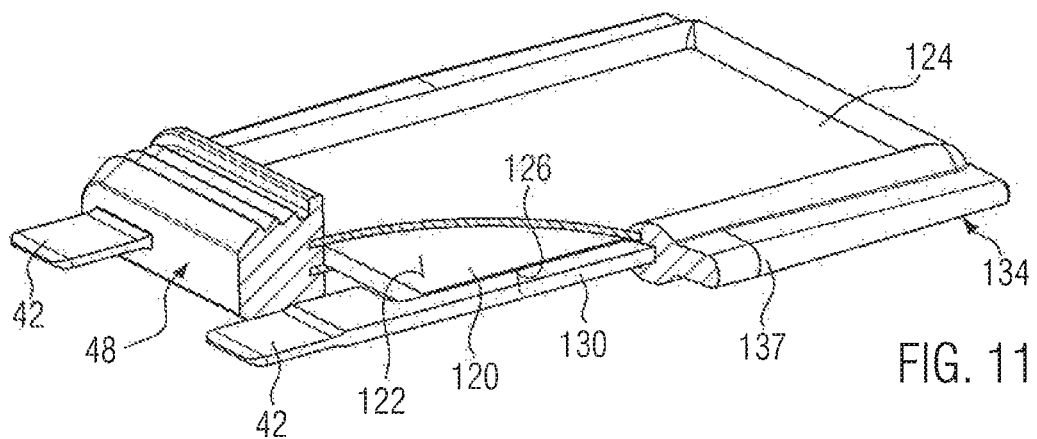
FIG. 11 shows a partially exposed perspective side view of parts of the PTC heating element.
Figure 12:
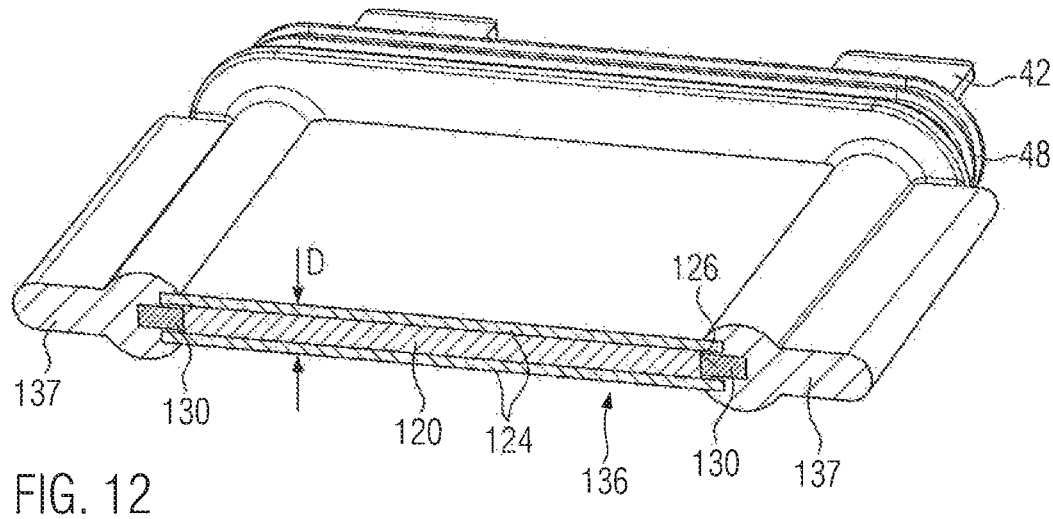
FIG. 12 shows a perspective cross-sectional view of the PTC heating element.

The contact ridges 130 presently form the electrodes to the PTC element are electrically connected to the metallization of the PTC element 120. The thickness of the contact strip 42 is smaller than the thickness of the contact ridge 30. Its thickness is in turn smaller than the thickness D of the PTC element. The sheet metal strip 128 is provided such that it does not project over the main side surfaces 122 of the PTC element 120 at any point. As can be seen in particular in FIGS. 11 and 12, the insulation layers 124 project laterally beyond the PTC element 120. The insulation layers 124 accordingly have a base area which is larger than the base area of the main side surfaces 122 of the PTC element 120. Accordingly, the outer edges of the insulation layers 124 receive the contact ridge 130 between themselves on both sides (see FIG. 12). Each contact ridge 130 is glued to one of the oppositely disposed face side surfaces 126. The insulation layer 124 is likewise glued to the PTC element 120. The insulation layer 124 abuts directly against the PTC element. One of the insulation layers 124 therefore directly contacts the associated main side surface 122 of the PTC element.

The outer side of the respective sheet metal strips 128 is completely flat and extends strictly in the direction of the length L. The contact strips 42 are in the width direction formed larger than the contact ridge 130 and project over the PTC element 120 towards each other (cf. FIG. 10). The contact strip 42 is also thinner than the contact ridge 130.

The region of the sheet metal strip 128, which is broadened as compared to the contact ridge 130, is received in a heating element casing 134 surrounding the PTC element 120 in a frame-like manner. This plastic frame 134 encloses the circumferential edges of the insulation layers 124. The edge surfaces 132 are also sealed by the material forming the plastic frame 134. The plastic frame 134 is formed as an elastomeric plastic frame 134 by overmolding elastomeric material. With the finished PTC heating element 40, only the contact strips 42 project over the plastic frame 134 on a face side. All other functional parts of the PTC heating element 40 used for heat generation and current conduction are accommodated within the plastic frame 134. As illustrated in particular by FIG. 12, the PTC element 120 with its oppositely disposed main side surfaces 122 is located behind frame openings which are designated by reference numeral 136 and are formed by the plastic frame 134. These frame openings 136 are covered by the insulation layer 124. Almost no covering of the plastic frame 134 with the main side surfaces 122 of the PTC element presently arises so that this exposes approximately 100% of its main side surfaces 122 behind the frame openings 136.

The frame ties of the plastic frame 134 protruding at a right angle from the sealing collar 48 are each provided with abutment ridges 137 on the edge side. The abutment ridges 137 are designed in the manner of tapered slats which have a thickness that tapers as compared to the thickness of the plastic frame 134. As can be seen, for example, in FIG. 6, the PTC heating elements 40 are each provided slightly staggered one behind the other such that each first PTC heating element 40 abuts against the wall of the casing 2 on the left side and is sealed there by the abutment ridge 137 which sealingly abuts against a border wall of the circulation chamber 14. Therefore, no fluid can flow past the PTC element 40 on this side, but it can flow past the PTC heating element that is in the flow direction located upstream or downstream. The latter, in turn, with its abutment ridge 137 abuts against the wall defining the circulation chamber 14 the opposite side and redirects the flow channel there. A meandering flow channel is thus formed by the alternating arrangement of the PTC heating elements 40.

6. Plug Connection

Figure 13:
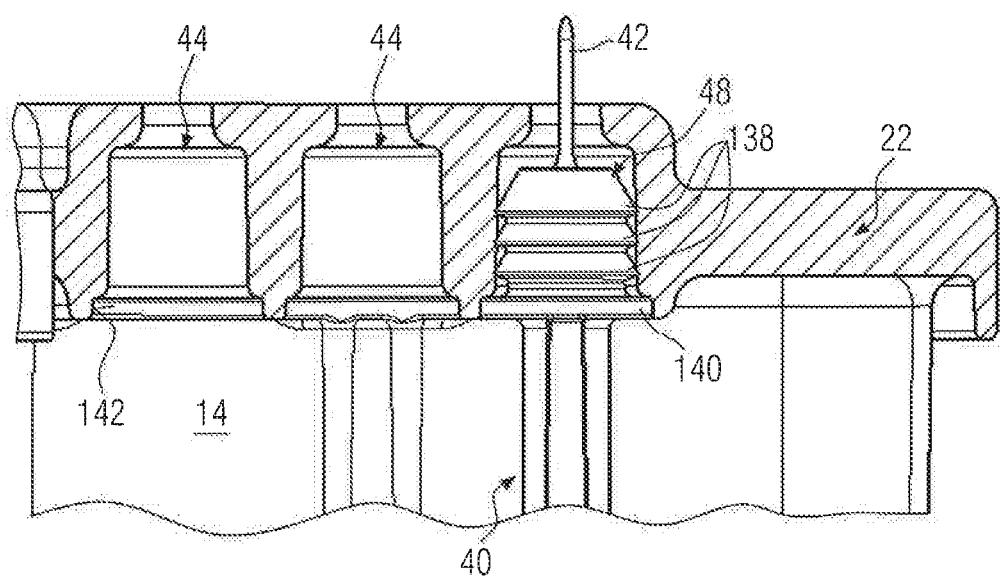
FIG. 13 shows a longitudinal sectional view through the cover plate according to FIGS. 3, 4 with a single PTC heating element accommodated therein.

The plastic frame 134 further forms the previously described sealing collar 48, which is provided with segments 138 tapering toward the free end of the contact strips 42 (cf. FIG. 13). Three of these segments 138 are presently provided one behind the other in the direction of longitudinal extension of the contact strip 42. An annular stop 140 is formed by the heating element casing 134 between the frame opening 136 and these segments 138. As illustrated by FIG. 13, this stop is in sealing abutment against a cylindrical mating surface 142 formed by the female plug element holding fixture 44.

Figure 2:
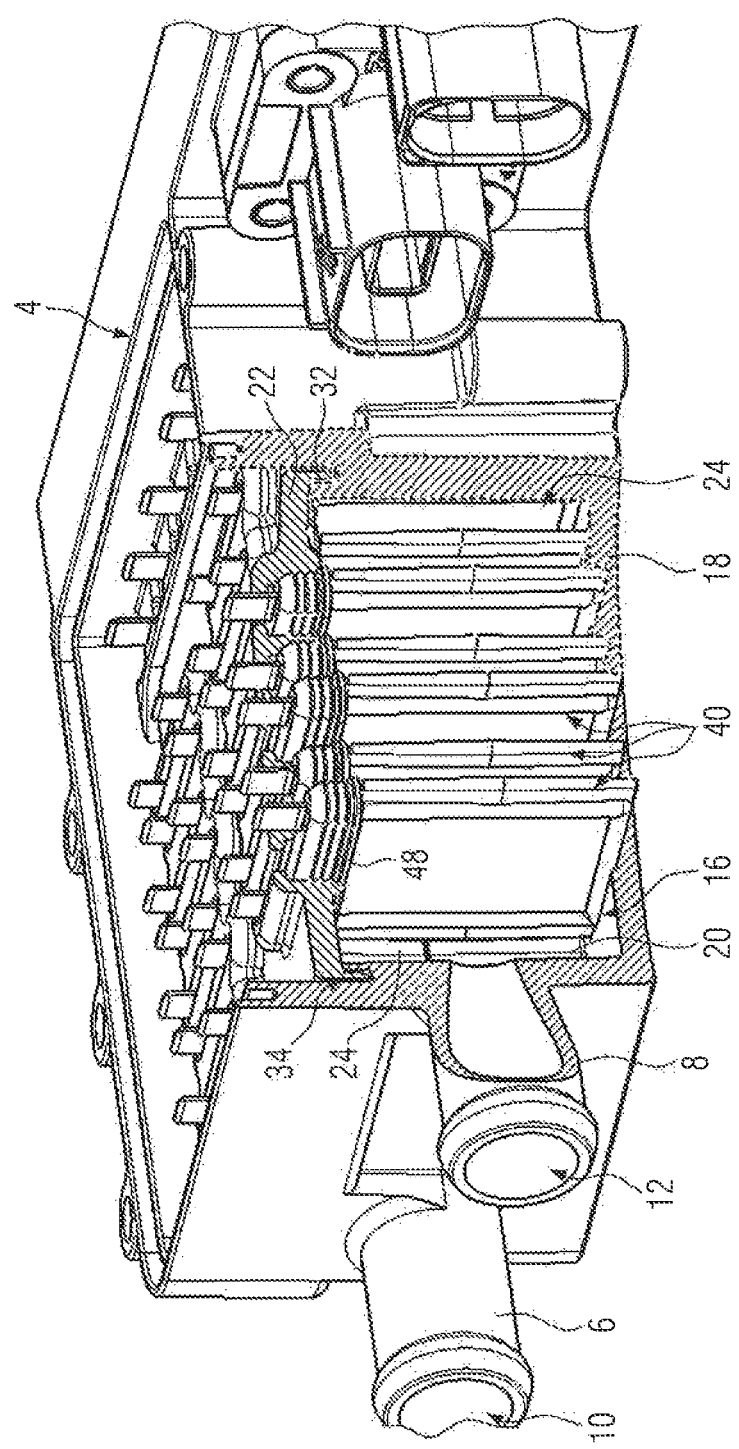
FIG. 2 shows a perspective side view of the embodiment shown in FIG. 1.

As illustrated in FIGS. 2 and 5, the oppositely disposed side of the PTC elements 40 abuts the base 18 of the casing 2 after installation. Provided in the base 18 for exact positioning are depressions 144 in which the face side surfaces of the heating element casing 134 are received. This ensures exactly right-angled positioning of the PTC heating elements relative to the partition wall 54. Furthermore, a holding force is generated which prevents the PTC heating elements 40 plugged into the partition wall 54 from dropping out of the female plug element holding fixtures 44 during operation and in particular due to the vibration of the vehicle. This base-side abutment of the PTC heating elements 40 also ensures the contact pressure within the plug contact of the PTC heating elements, so that they securely and also permanently seal the longitudinal slots 46 to the connection chamber 56.

It is understood that the depressions 144 can also be dispensed with. Similar to the abutment ridges 137, an abutment ridge 137 can also be provided on the underside of the plastic frame 134 disposed opposite to the sealing collar 48 and seal there and be supported and in abutment against the base 18 of the casing 2 subject to elastic compression. This not only provides a fluidly tight seal between the underside of the PTC heating element 40 and the casing 2. Rather, a compressive force is also generated due to the compression of the abutment ridge and holds the PTC heating element 40 captively in the female plug element holding fixture 44 even when strong vibrations act upon the electric heating device.

7. Electric Connection of the PTC Heating Elements

Figure 15:
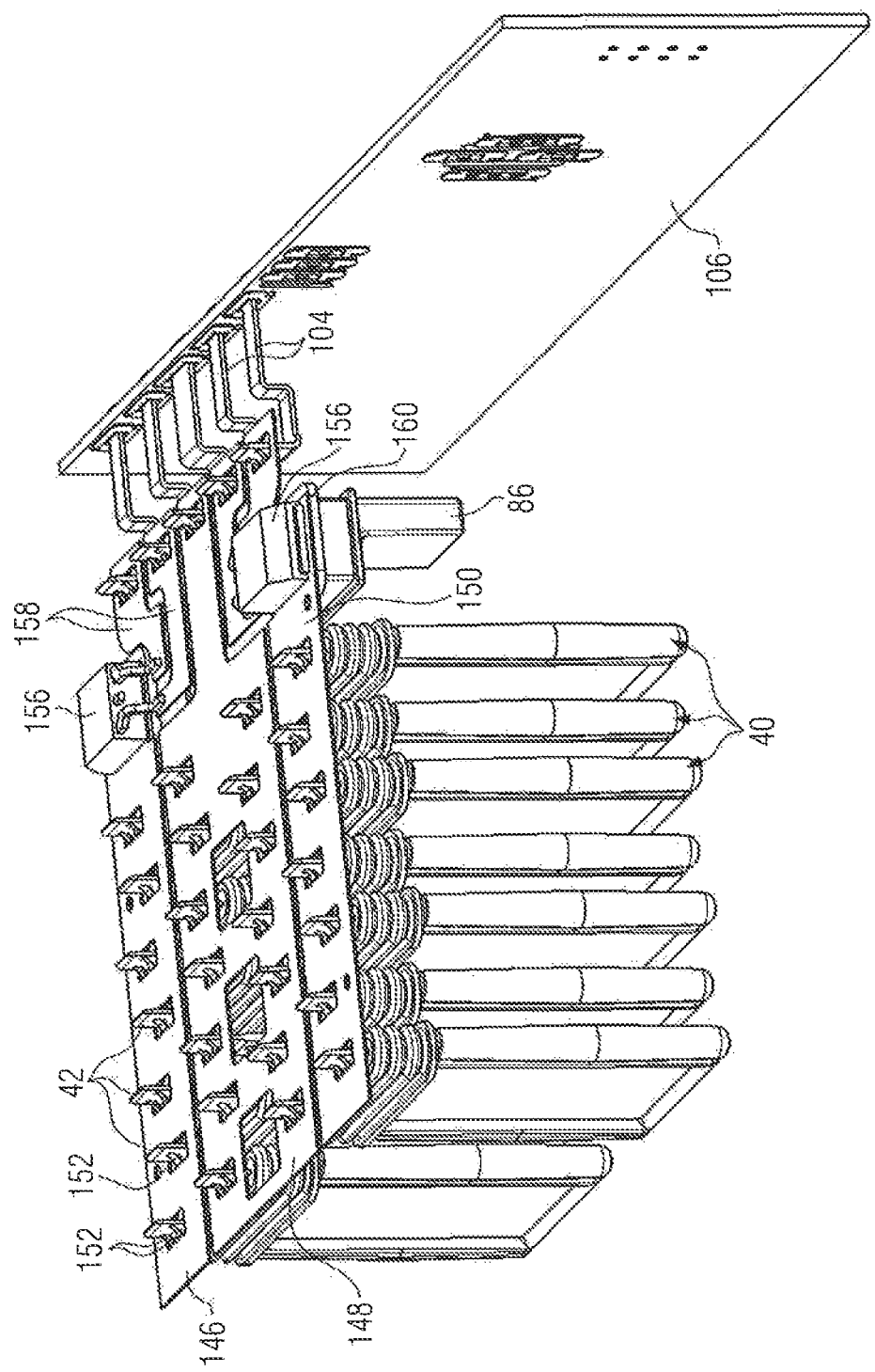
FIG. 15 shows a view similar to FIG. 14 of the further embodiment without the casing cover.
Figure 16:
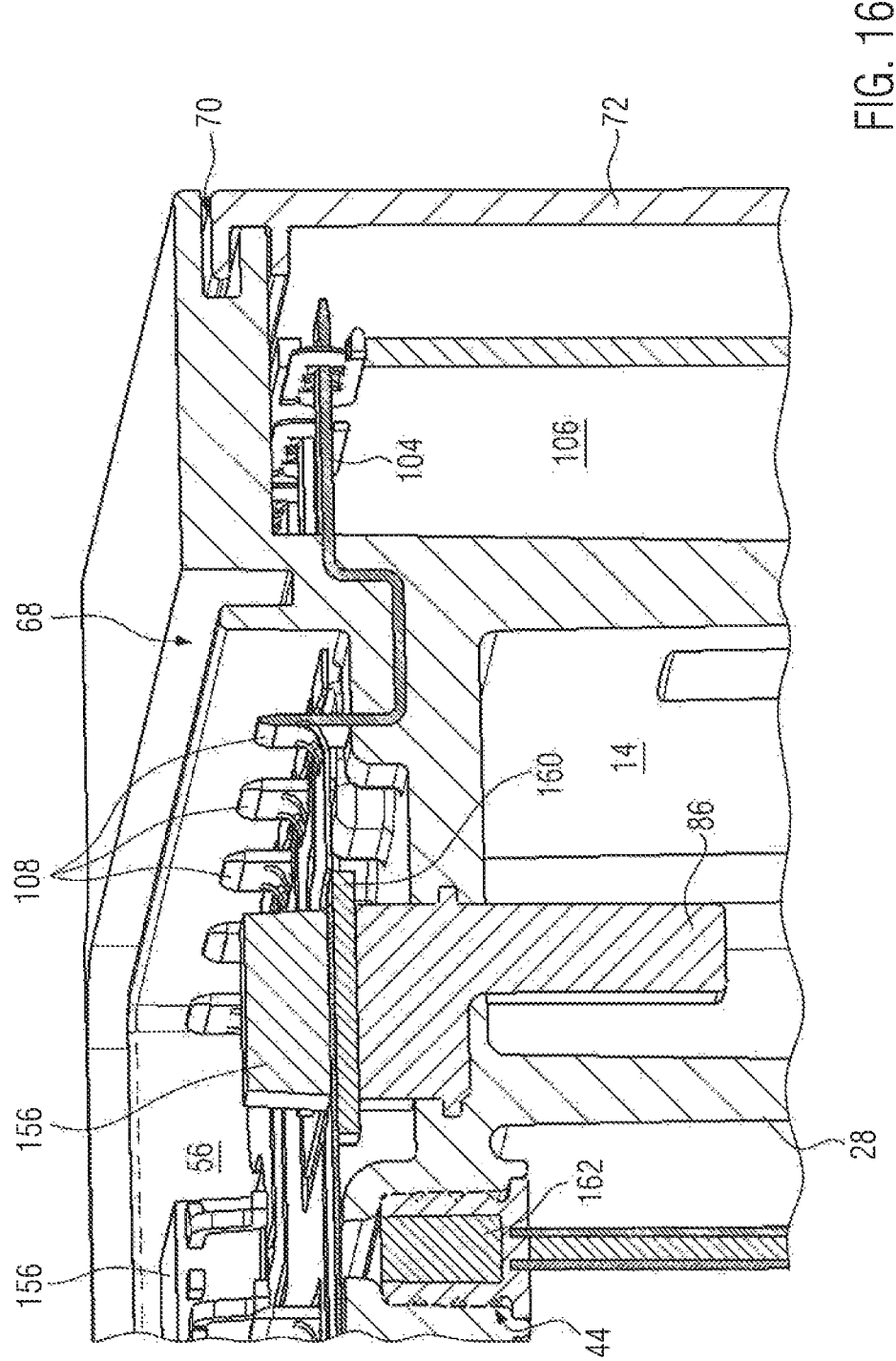
FIG. 16 shows a perspective sectional view through the partition wall of the further embodiment.

FIGS. 14-16 illustrate the electric connection of the PTC heating elements 40 using the example of a further embodiment. FIG. 15 shows the embodiment without the casing 2 and parts thereof, similar to the illustration in FIG. 3. For the electric connection, pieces of punched sheet metal are provided in the connection chamber 56 as current bars 146, 148, 150, comprising contact projections 152 formed by punching and bending which abut against the contact strips 42 subject to elastic pretensioning and contact them. The contact projections 152 project into receptacle openings 154 which are recessed in the sheet metal strips of the current bars 146, 148, 150. The current bar, designated by reference numeral 148, has a corresponding receptacle opening 154 with contact projections 152 for the current bar 104.

The current bars, designated by reference numbers 146 and 148, are each equipped with a power transistor 156 which is connected in an electrically conductive manner to the respective current bar 146, 150 and mounted thereon. The power transistors 156 are connected on the input side to conductors 158 which are likewise formed as current bars, and which are again provided with receptacle openings 154 with contact projections 152 for respectively contacting via a current bar 104. Electric conduction within the containment chamber 56 [sic] is effected solely by way of sheet metal elements. These sheet metal elements are equipped exclusively with the power transistors 156 as electric or electronic components. No further electric or electronic components are provided.

As shown in particular in FIG. 16, these metal plates 146, 148, 150, 158 are inserted in a manner electrically insulated from one another into the connection chamber 56 and positioned there. The control signals for actuating the power transistors 146 processed on the circuit board 106 are supplied to the respective power transistor 156 via at least one of the conductors 158.

FIG. 16 illustrates a sectional view at the height of a cooling element, denoted by reference numeral 86 also in FIG. 15. An electrical insulation coat 160 made, for example, of Kapton or a ceramic plate is implemented between the cooling element 86 and the power transistor 156. The current bar 146, 150 provided between this insulation coat 160 and the power transistor 156 results in a certain spread of the heat emitted by the power transistor 156. For this purpose, the current bar 146 or 150, respectively, can be configured to have a greater thickness at least in the region of the power transistor 156. It is equally possible to form the current bar 146 or 150, respectively, from copper and thus from a material that exhibits good thermal conductivity. The sheet metal material can have an increased thickness in the region of the power transistor 156 due to contour rollers.

The current bars 146, 148, 150, 158 can be provided with a crimping tab or the like by way of punching which interacts with the casing 2 to attach the respective current bar 146, 148, 150, 158 to the casing 2, and/or to abut or press the power transistor 146 against the cooling element 86 subject to pretension.

FIG. 16 also shows a variant of the PTC heating element 40. According thereto, the contact strips 42 are received within the plastic frame 134 in an attachment plug 162 formed from a hard plastic component. The contact strips 42 are received in the attachment plug 162 by way of overmolding. The attachment plug 162 is made of hard plastic material with good resistance to leakage current and sparkover. The attachment plug 162 forms a hard core for the male plug element formed by the PTC heating element 40. This attachment plug 162 is merely covered by a thin coating of the soft-elastic material of the sealing collar 48, whereby the compression force formed by the sealing collar 48 within the female plug element holding fixture 44 is increased. The attachment plug 162 can be effected, for example, by overmolding two sheet metal strips 128, each of which individually forms the contact ridges 130 and the contact strips 42 as an integrally formed component. Prepared in this manner and positioned spatially and physically relative to one another, the attachment plug 162 together with the sheet metal strip 128 can be overmolded with the soft-elastic plastic component for forming the plastic frame 134, as described above.

The sealing collar is formed to be elongate also in the variant according to FIGS. 14-16. However, it goes without saying that each individual contact strip 42 can be arranged in a cylindrical sealing collar with a basically circular or oval cross-sectional area. The female plug element holding fixture 44 is then likewise provided with a cross-section that is circular or oval, respectively. Such an embodiment can increase the tightness as compared to the specifically described embodiment. It is understood that polygonal cross-sectional areas are also possible.

FIG. 16 further shows the attachment of the cooling element 86 within the partition wall 54. At the height of the partition wall 54, the cooling element 86 has an attachment collar 164 on its outer circumference which projects beyond the cooling element 86 on the edge side and is sealed in a positive-fit manner by overmolding the plastic material forming the partition 54. The design of the attachment collar 164 incidentally also improves the tightness between the circulation chamber 14 and the connection chamber 56.

According to a variant (not shown), the surface of the cooling element 86 projecting to the connection chamber 56 can also be covered with the plastic material forming the partition wall 54. When the cooling element 46 is overmolded, a thin film can be formed by injection molding between the surface of the cooling element 86 and the interior of the connection chamber 56, via which the power transistor 156 abuts against the cooling element 68 in an electrically insulated manner. This further simplifies production. A separate electrical insulation layer does not need to be provided between the power transistor 156 and the cooling element 86.

We claim:

1. An electric heating device comprising:
a PTC heating element having a heat-emitting surface;
a PTC element;
a plastic casing that forms inlet and outlet openings for a fluid to be heated and a circulation chamber as well as a connection chamber separated from said circulation chamber by way of a partition wall, wherein
the heat-emitting surface of the PTC heating element is exposed in said circulation chamber and is coupled in a heat-conductive manner to said PTC element, wherein
said PTC element is in electrically conductive contact via electrical conductor tracks with different polarities that are electrically connected in said connection chamber, and wherein
said plastic casing is provided with a shielding, which shielding encloses the casing substantially entirely circumferentially.

2. The electric heating device according to claim 1, wherein said plastic casing accommodates a control device which is circumferentially surrounded by said shielding.

3. The electric heating device according to claim 1, further comprising a control chamber which is formed by said plastic casing and in which a control device is accommodated.

4. The electric heating device according to claim 1, further comprising at least one current bar that penetrates a wall of said plastic casing and that is accommodated in said wall in a sealing manner by way of overmolding, wherein said plastic casing is formed from a cross-linked plastic material.

5. The electric heating device according to claim 1, wherein said shielding is formed by a metal casing, which metal casing surrounds the plastic casing and comprises at least two shell elements which receive therebetween inlet and outlet ports of said plastic casing which form said inlet and outlet openings.

6. The electric heating device according to claim 5, wherein said metal casing comprises recesses through which attachment projections formed by said plastic casing project over an outer surface of said metal casing.

7. The electric heating device according to claim 1, wherein said plastic casing is formed from a cross-linked plastic material.

8. An electric heating device comprising:
a PTC heating element having a heat-emitting surface;
a PTC element; and
a plastic casing that forms inlet and outlet openings for a fluid to be heated and a circulation chamber as well as a connection chamber separated from said circulation chamber by way of a partition wall, wherein
the heat-emitting surface of a PTC heating element is exposed in said circulation chamber and is coupled in a heat-conductive manner to said PTC element, wherein
said PTC element is in electrically conductive contact via electrical conductor tracks with different polarities that are electrically connected in said connection chamber, wherein
said plastic casing comprises a control chamber receiving a control device, which control device is adapted to control the at least one PTC heating element, and wherein
said plastic casing is provided with a shielding, which shielding encloses the casing substantially entirely circumferentially and shields electromagnetic waves generated within said plastic casing.

9. The electric heating device according to claim 8, wherein said shielding is provided with a ground connection interface.

10. An electric heating device comprising:
a PTC heating element having a heat-emitting surface;
a PTC element;
a plastic casing that forms inlet and outlet openings for the fluid to be heated and a circulation chamber as well as a connection chamber separated from said circulation chamber by way of a partition wall,
wherein the heat-emitting surface of the PTC heating element is exposed in said circulation chamber and is coupled in a heat-conductive manner to said PTC element,
wherein said PTC element is in electrically conductive contact via electrical conductor tracks with different polarities that are electrically connected in said connection chamber,
wherein said plastic casing is provided with a shielding, which shielding encloses the casing substantially entirely circumferentially, and
wherein said shielding is formed by a metal casing, which metal casing surrounds the plastic casing and comprises at least two shell elements which receive therebetween inlet and outlet ports of said plastic casing which form said inlet and outlet openings.

\* \* \* \* \*